Patented July 6, 1926.

1,591,049

UNITED STATES PATENT OFFICE.

CATHERINE D. MURRAY, OF BRIDGEPORT, CONNECTICUT.

ANTICORROSIVE COMPOUND.

No Drawing.   Application filed September 30, 1925.   Serial No. 59,539.

This invention relates to improvements in anticorrosive compounds, with special reference to electric battery cells and has as one of its objects to provide a compound or composition of matter that being applied to a metallic surface, will prevent corrosion of the same.

A further object is in the production of a compound that will, when properly applied, tenaciously adhere to a metallic surface and effectively protect such surface in the presence of water, and most acids or alkalies when subjected to them.

Another aim is in the provision of a rust resisting compound that is a good non-conductor of electricity and also of heat.

The compound consists of a mixture of petroleum jelly, commonly called vaseline, asphaltum, as obtained by the distillation of coal, red oxide of lead and a small quantity of methyl salicylate, together with oils of citronella and red cedar, the latter elements acting as a deoderizer for the asphaltum.

In preparing the composition the ingredients are used in substantially the following proportions:—vaseline 7 pounds, 10 ounces; asphaltum 4 pounds, 4 ounces; red lead 4 pounds, 14 ounces.

The vaseline and asphaltum are melted separately, then mixed and maintained at a temperature of approximately 520 degrees Fahrenheit, for a period of two and one-half hours.

Thereafter the mass is cooled to between 350 to 400 degrees and the red lead added, constantly stirring to produce a uniform mixture.

This mass will have such consistency as to permit it to be readily applied to the surfaces it is to protect, and to which it will adhere, the surfaces being in a clean condition, free from rust or similar encrustations, the application being made by dipping or brushing as may be most convenient, after the compound has cooled, the same thickening as it cools. It is applied cold.

The oil of citronella may be omitted but it is preferred to use the same so that the odor of the compound is effectually disguised.

Having thus described my invention and the manner of its preparation and application, what I claim as new and desire to secure by Letters Patent, is:—

A composition for preventing corrosion on metallic surfaces, comprising vaseline 45%, asphaltum 25%, red lead 29% and one percent of a compound comprising methyl salicylate 40 per cent, oil of citronella 40 per cent and oil of red cedar 20 per cent.

In witness whereof I have affixed my signature.

CATHERINE D. MURRAY.